(12) United States Patent
Suprono

(10) Patent No.: US 7,896,367 B1
(45) Date of Patent: Mar. 1, 2011

(54) PANEL CARRIER AND LIFTER

(76) Inventor: Kurt M. Suprono, Killingworth, CT (US)

( * ) Notice: Subject to any disclaimer, the term of this patent is extended or adjusted under 35 U.S.C. 154(b) by 264 days.

(21) Appl. No.: 11/949,373

(22) Filed: Dec. 3, 2007

(51) Int. Cl.
B62B 1/10 (2006.01)
(52) U.S. Cl. ............... 280/47.15; 280/79.7; 280/47.26
(58) Field of Classification Search ............ 280/79.7, 280/79.11, 47.31, 79.6, 79.2, 47.23, 47.27–47.29, 280/47.15, 47.17, 47.24, 47.26, 47.28, 47.131
See application file for complete search history.

(56) References Cited

U.S. PATENT DOCUMENTS

| 2,710,106 | A | * | 6/1955 | Hanson | 414/456 |
| 3,090,635 | A | * | 5/1963 | Masterson, Jr. | 280/47.131 |
| 3,841,651 | A | | 10/1974 | Bigney | |
| 3,871,054 | A | | 3/1975 | Schaefer | |
| 4,630,838 | A | * | 12/1986 | Stockton | 280/47.17 |
| D310,894 | S | * | 9/1990 | Smith | D34/23 |
| 5,318,316 | A | * | 6/1994 | Shurtleff | 280/79.7 |
| 5,378,103 | A | | 1/1995 | Rolnicki et al. | |
| 5,749,113 | A | | 5/1998 | Witter | |
| 5,782,477 | A | | 7/1998 | Covert | |
| 5,814,842 | A | | 9/1998 | Muldoon et al. | |
| 5,820,145 | A | * | 10/1998 | Osowski | 280/79.7 |
| 6,234,499 | B1 | * | 5/2001 | Irwin et al. | 280/63 |
| 6,250,655 | B1 | | 6/2001 | Sheeks | |
| 6,678,909 | B1 | | 1/2004 | Pyatt | |
| D550,921 | S | * | 9/2007 | McMorris | D34/23 |

OTHER PUBLICATIONS

All-Wall Drywall Tools Superstore, The Troll drywall tools, Online catalog, article retrieved prior to filing date of application.
McMaster-Carr, Sheet and Panel Trucks, Online catalog, p. 1233, article retrieved prior to filing date of application.
Toolsfortrades.com, Drywall Dolly/Lifters, Online catalog, article retrieved prior to filing date of application.
Northern Tool & Equipment, Panel Cart, Online catalog, article retrieved prior to filing date of application.

* cited by examiner

Primary Examiner—Lesley D Morris
Assistant Examiner—Erez Gurari
(74) Attorney, Agent, or Firm—DeLio & Peterson LLC; Peter W. Peterson

(57) ABSTRACT

A device for transporting and positioning a panel comprising an elongated support member and a base to carry the panel. An upright handle is attached to the support member providing support for the panel. An axle is secured to the support member with at least two wheels rotationally mounted on the axle permitting the support member to pivot about the axle for raising and lowering the support member ends. A lifting lip is attached to one end of the support member and a foot pedal attached to the other end. The panel is carried on the support member base and transported to a desired location. After removing the panel from the base and placing it on the lip, the wheels move the panel toward and away from the desired location. The foot pedal is depressed to pivot the support member about the axle lifting the panel to a desired height.

20 Claims, 5 Drawing Sheets

PANEL CARRIER AND LIFTER

BACKGROUND OF THE INVENTION

1. Field of the Invention

The present invention relates to a device and method for transporting a panel and for positioning the panel for fastening to a wall or structure during construction.

2. Description of Related Art

During the construction of a home or other structure, builders often must install various large panels, whether it is a door, or sheet of plywood, cementboard or wallboard. There is always a need for devices to make the transport and installation of these construction materials easier and less time consuming. There are several devices which have been built to move material such as panels, the devices commonly having wheels, which allow the user to load the device, wheel the material to the location of install, and unload the material from the device. These types of devices are convenient for transport of the material unless the route from load location to unload location includes terrain which does not permit rolling of the device. Coarse gravel, sand, and mud may be a deterrent to using such a device. This is especially evident in cases where heavy dollies add weight to the load being carried. These devices make it impractical to transport material over rough or soft terrain or over floor obstacles such as thresholds, crevices, and steps.

During the installation of such panels described above, the panel may have to be lifted a small distance in order to be mounted at its correct height. For example, the bottom edge of an installed door usually does not sit directly on the ground or floor. To allow free movement of the door, the door is supported by the hinges. To aid in the positioning and holding of the door during the installation there are lever/fulcrum devices called lifting devices that may be used in which the worker places an end of the device under the bottom edge of the door and presses down on the opposite end, lifting or positioning the door. These devices may be used to lift a sheet of wallboard, plywood or cementboard into place for mounting or installation. These devices however lack the ability to help transport the panel, or to aid in positioning the panel toward and away from the installation location while it is being lifted.

SUMMARY OF THE INVENTION

Bearing in mind the problems and deficiencies of the prior art, it is therefore an object of the present invention to provide a method and device for transporting and positioning a panel.

It is another object of the present invention to provide a device for transporting and positioning a panel which provides a handle to allow the user to carry the device over rough terrain.

A further object of the invention is to provide a method and device to aid in positioning the panel toward and away from the installation location while it is being lifted.

Still other objects and advantages of the invention will in part be obvious and will in part be apparent from the specification.

The above and other objects, which will be apparent to those skilled in the art, are achieved in the present invention which is directed to a device for transporting and positioning a panel comprising an elongated support member having sides and opposite ends shorter than the sides, the support member having a base of sufficient length to carry a panel. The device includes an upright handle attached to the support member, which provides support for a panel carried by the support member base, and an axle secured to the support member between the ends in a direction perpendicular to the length of the base. The device also includes at least two wheels rotationally mounted on the axle with at least one wheel on each side of the support member and of sufficient size to permit the support member to pivot about the axle to raise and lower the support member ends. Additionally, the device includes a lifting lip attached to one end of the support member and a foot pedal attached to the other end of the support member. The panel may be carried on the support member base and transported to a desired location and, after removing the panel from the base and placing it on the lip in a position approximately perpendicular to the length of the base, the wheels may move the panel toward and away from the desired location. The foot pedal may be depressed by a user to pivot the support member about the axle and cause the lip to lift the panel to a position at a desired height at the location.

Preferably, the lip is at an angle to the support member base. Also, the foot pedal is preferably elevated from the support member base.

The handle may have two upwardly extending members each having an end attached to the support member and an opposite end attached to a cross member wherein the handle may be grasped by the user to assist in moving the panel toward and away from the desired location and to lift the panel to a position at a desired height at the location. Alternately, the handle may have an upwardly extending member having an end attached to the support member and an opposite end connected to a cross member wherein the handle may be grasped by the user to assist in moving the panel toward and away from the desired location and to lift the panel to a position at a desired height at the location.

The device for transporting and positioning a panel preferably includes a pair of support member guide plates extending upward on opposite sides of the base to hold the panel in position on the base during transport. The support member and handle may be metal or plastic, or any other suitable material.

In another aspect, the present invention is directed to method for transporting and positioning a panel. The method includes providing a panel and a device for transporting and positioning the panel. The device comprises elongated support member having sides and opposite ends shorter than the sides, the support member having a base of sufficient length to carry a panel. The device also includes an upright handle attached to the support member, the handle being adapted to provide support for a panel carried by the support member base, and an axle secured to the support member between the ends in a direction perpendicular to the length of the base. The device further includes at least two wheels rotationally mounted on the axle with at least one wheel on each side of the support member and of sufficient size to permit the support member to pivot about the axle to raise and lower the support member ends. Additionally, the device includes a lifting lip attached to one end of the support member and a foot pedal attached to the other end of the support member. The method includes placing the panel on the support member such that a bottom edge of the panel rests on the support member base and exerting a force on the handle sufficient to cause the wheels to rotate to move the device and transport the panel in a desired direction. The method additionally includes removing the panel from the device and placing the panel on the floor near a desired location of installation, orienting the support member base in a direction approximately perpendicular to the panel and placing the angled lip under a bottom edge of the panel. The method then includes moving the panel with the wheels toward and away from the desired location, exerting a force on the foot pedal sufficient to pivot the support member about the axle raise the lip and panel to a position at a desired height at the location and securing the panel in a desired location.

The method may include exerting an upward force on the handle and carrying the device and panel over terrain not suitable for rolling the device. The method may additionally include exerting a force on the handle to assist in moving the panel toward and away from the desired location while lifting the panel to a position at a desired height at the location.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-4 of the drawings in which like numerals refer to like features of the invention.

As used herein, the term transporting refers to moving a panel placed on the described device from one location to another, usually relating to a substantially horizontal direction. Transporting may include rolling the device and panel as well as carrying the combination by use of a handle on the device. The term positioning refers to moving the panel toward and away from the installation location and lifting the panel in a vertical direction prior to securing the panel in place.

Figure 1:
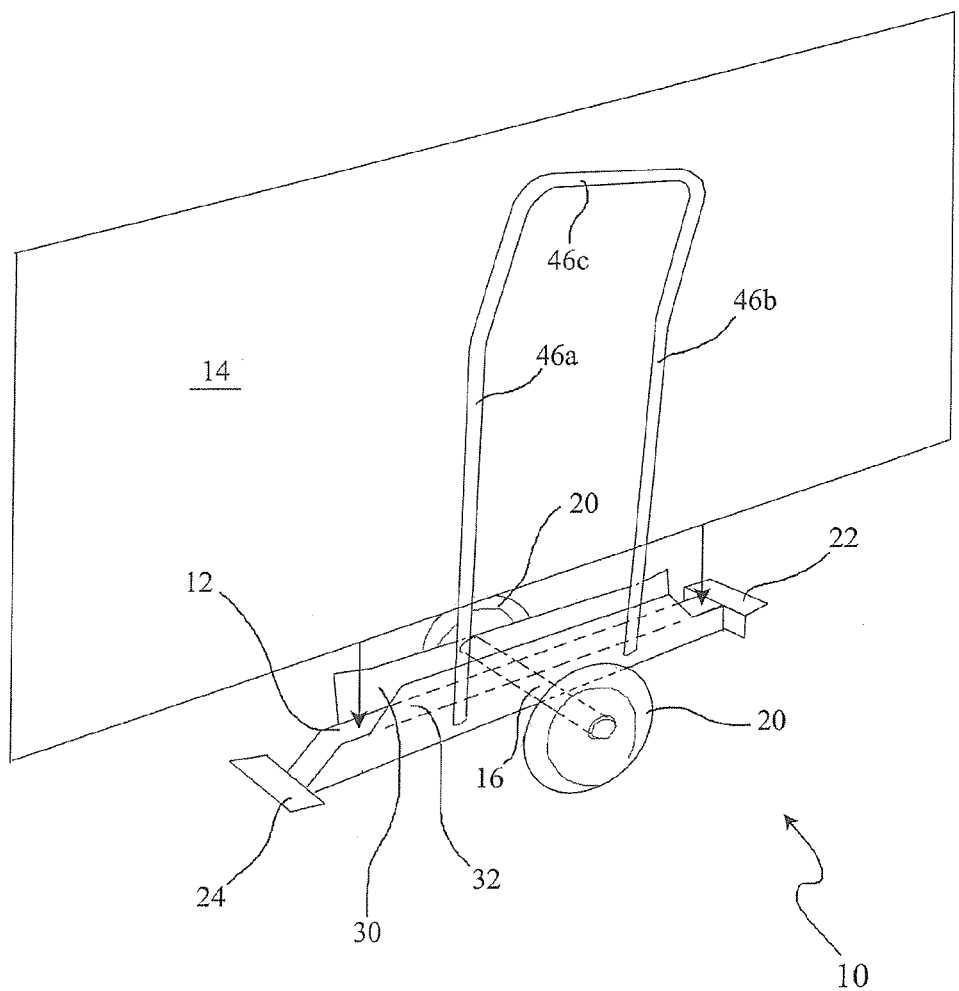
FIG. 1 is a perspective view of one embodiment of the transporting and positioning device of the present invention.
Figure 2:
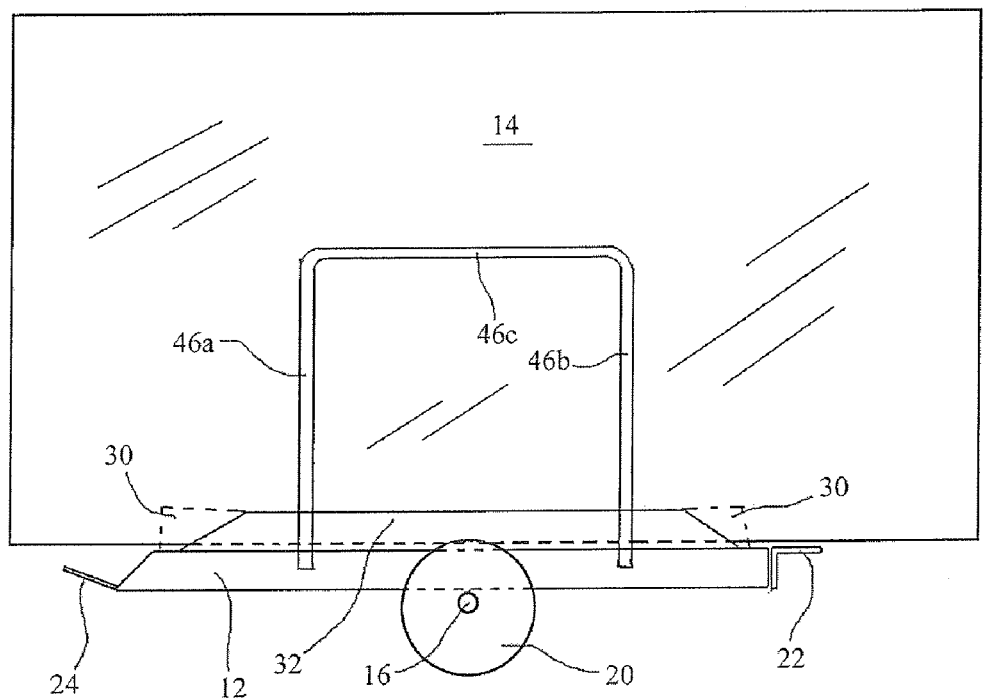
FIG. 2 is a side elevational view of the transporting and positioning device in FIG. 1.
Figure 3:
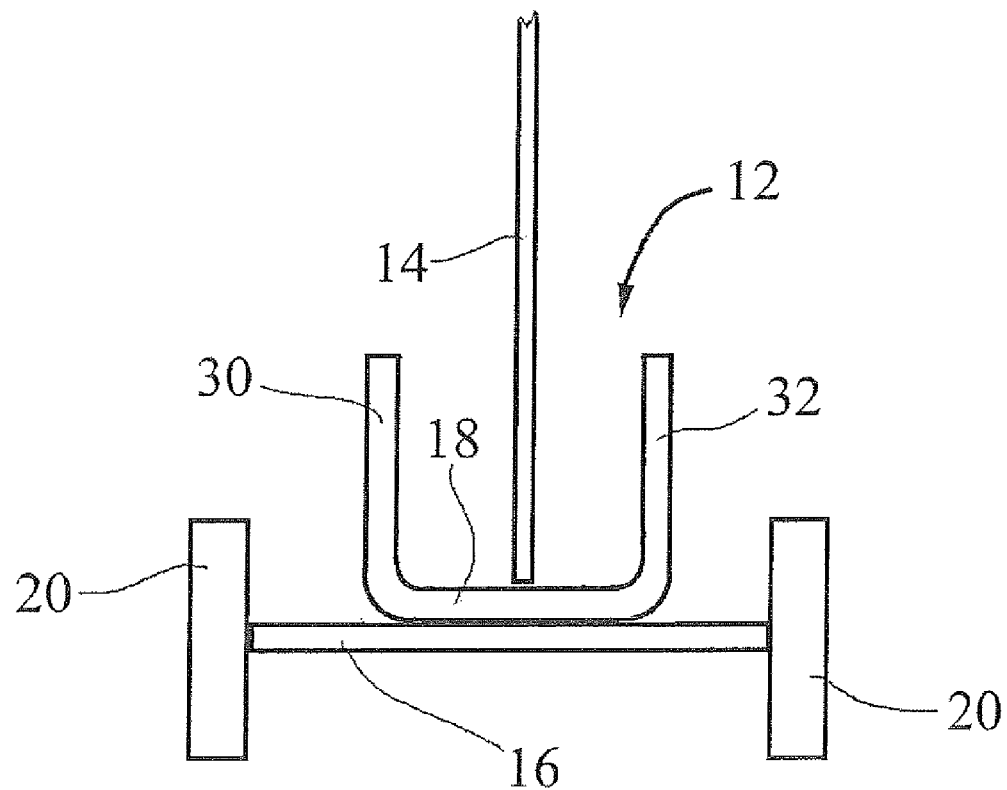
FIG. 3 is a front elevational view of the transporting and positioning device in FIG. 1.

The transporting and positioning device 10 of the present invention as shown in a first embodiment in FIGS. 1-3 comprises an elongated support member 12 having a width, a length greater than the width and opposite ends. The device includes an axle 16 attached along the underside of support member 12 width and is located approximately centered between the ends of the support member and perpendicular to the length of the support member. The axle has wheels 20 rotatably attached, preferably one wheel on each side of the support member. The wheels are of sufficient size to permit the support member to pivot about the axle and raise and lower the support member ends.

The support member may have attached thereon support member guide plates 30, 32 extending upward from base 18 such that a panel 14 to be transported may be placed on the support member 12 between the guide plates. The base is of sufficient length to contact at least a portion of the lower edge of panel 14 to carry the panel and guide plates 30, 32 are of sufficient height to prevent the panel 14 from sliding off the base 18 of the support member 12. Where the device includes the guide plates 30, 32, the upwardly extending handle members 46a, 46b are attached along the outside surface of guide plate 32. The preferred embodiment of the present invention has tapered ends on the guide plates 30, 32 to guide the panel when loading of the panel entails sliding the panel from an end of the support member. The transporting and positioning device 10 includes an angled lip 24 attached to one end of the support member, the angled lip being a substantially flat plate attached so that a top surface is at a small, acute angle with respect to support member base 18. Preferably, the angle is such to allow the angled lip 24 to lay flat on the floor or ground when the support member is pivoted about axle 16 and the angled lip is lowered to accept the panel. The opposite end of the support member has a foot pedal or toe lift 22 attached so that the user may use the toe of his foot to press down on the foot pedal, thereby pivoting the support member about axle 16 and raising the angled lip of the device. Preferably, the foot pedal is elevated with respect to the support member base.

The transporting and positioning device 10 also includes a handle 46. In the preferred embodiment shown in FIGS. 1 and 2, the handle has two upwardly extending members 46a, 46b each having an end attached to the support member and guide plate 32. The opposite ends of the upwardly extending members are connected by a cross member 46c. The upwardly extending members 46a, 46b may be bent at an angle along its length to position the cross member a distance from the panel so the user may be able to grasp the cross member without the panel 14 hitting or pinching the user's hand.

Figure 4:
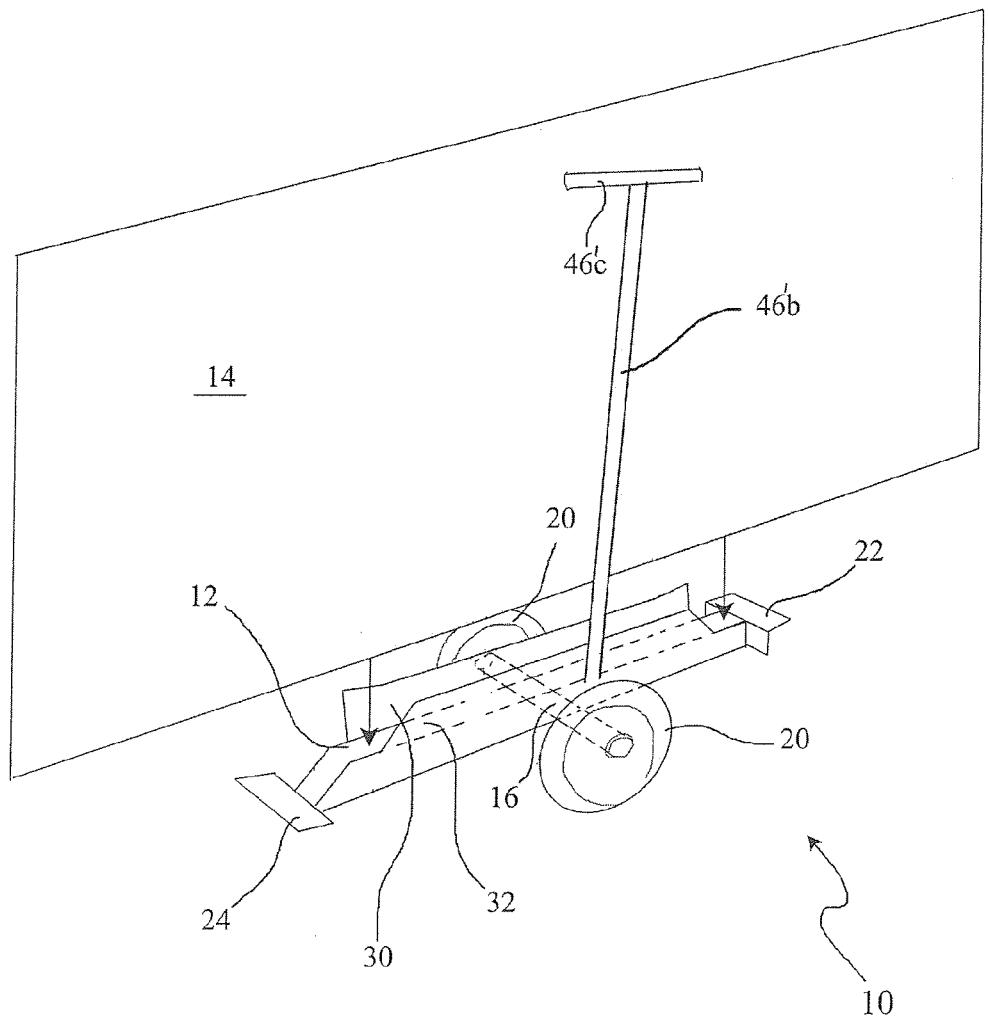
FIG. 4 is a perspective view of a second embodiment of the present invention.

In another embodiment of the invention shown in FIG. 4, the handle 46' consists of one upwardly extending member 46'b attached at one end to the support member and at the opposite end to a cross member 46'c. Both handle embodiments permit the user to grasp the handle with his hand to assist in operating the device to transport and opposition the panel.

The preferred embodiment of the transporting and positioning device is made predominantly of a metal such as steel or aluminum. The axle, guide plate, handle, angled lip and foot pedal may be attached to the support member by welding, although fasteners may also be employed. Any or all of the elements of the present invention may alternately be made of plastic, making the device lighter in weight.

In operation, the transporting and positioning device 10 is loaded by placing at least one panel 14 on the support member 12 such that the bottom edge of the panel rests on the support member base 18 and between the support member guide plates 30, 32. The user then exerts a force on the handle 46 in a direction along the length of the support member, moving the device to transport the panel in the desired direction. If the movement of the transporting and positioning device 10 is impeded by a surface in which the wheels will not easily roll, such as a threshold, crevice or loose surface, the user may raise the device and panel by exerting a force upward on the handle and carry the device and panel across the impeding surface.

Figure 5:
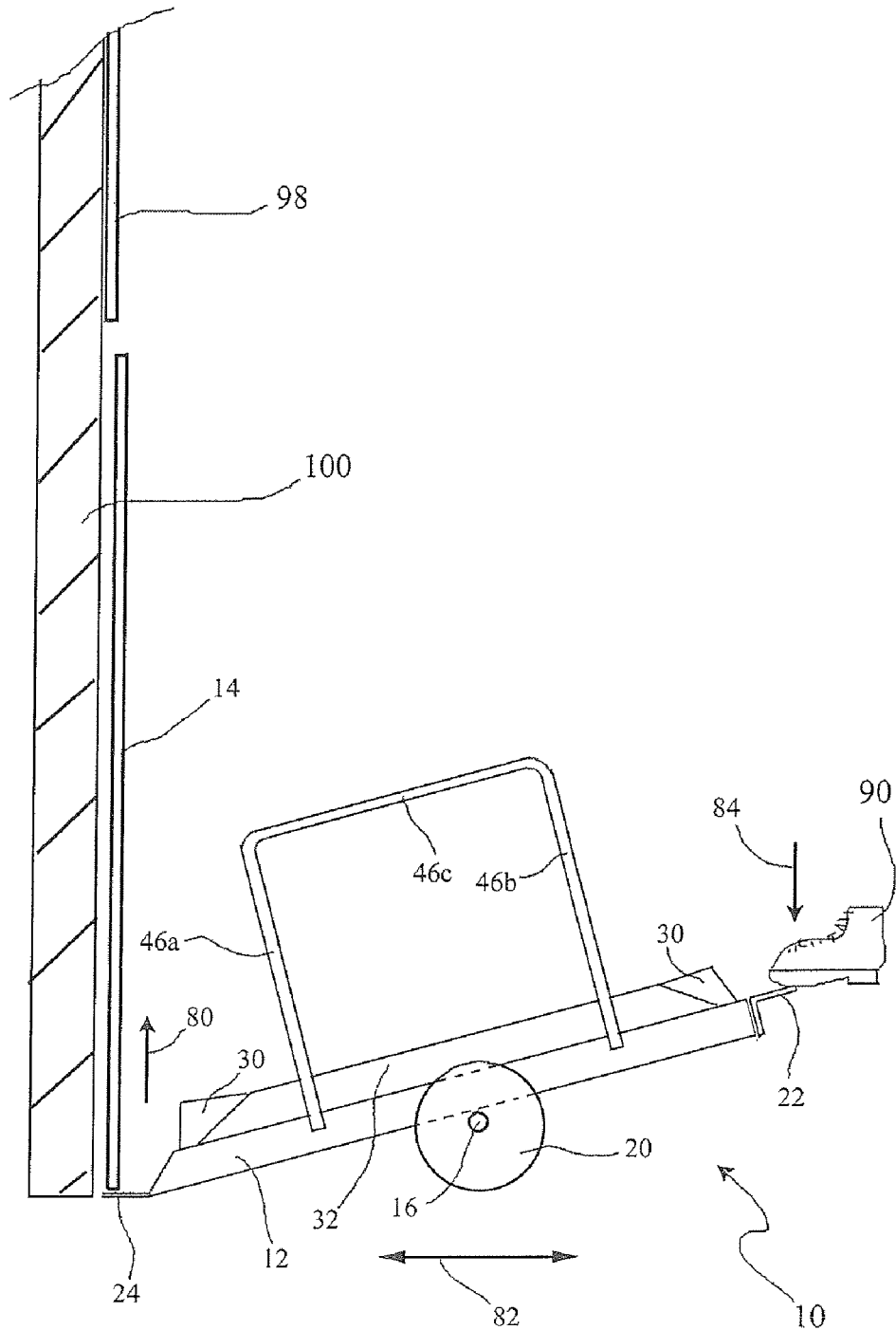
FIG. 5 is a side elevational view of the transporting and positioning device of FIG. 1 showing the operation of the device to position and lift a panel at a desired location for installation.

When the user arrives at the destination for the installation of the panel, the panel is unloaded from the device and placed on the ground proximate the location where it is to be fastened. Where the panel is a sheet of plywood, drywall or cementboard as shown in FIG. 5, the panel is placed against a wall 100 below where it is to be fastened against an upper panel 98. The user then grasps the handle to orient the support member in a direction approximately perpendicular to the plane of the panel and inserts the angled lip 24 of the transporting and positioning device 10 under the bottom edge of the panel. Using foot 90, the user then exerts a force downward on the foot pedal 22 shown by the downward arrow 84 in FIG. 5, sufficient to pivot the support member about axle 16 and raise the panel 14 on lip 24 at the opposite end in the direction shown by the upward arrow 80. At the same time, the user may grasp the handle and move the wheels 20 in the directions of arrow 82 to position the lower end of panel 14 toward and away from the wall 100. Where the panel 14 is a door, after the door is unloaded from the transporting and positioning device, the door is placed with the hinged end near a door frame, the angled lip 24 inserted under the bottom edge of the door and raised to a desired height by the user exerting sufficient force downward on the foot pedal. The door may then be attached to the door from by a set of door hinges.

Thus the present invention solves the problems associated with the transporting and positioning of a panel. The device allows the user to roll the panel along surfaces that are fairly smooth, while providing a handle in which to lift and carry the device with the panel across rougher surfaces or obstacles. The device will additionally operate as a convenient positioning aid once the panel is placed near its final installed location, where the user may move the panel toward and away from the installation location while lift the panel a desired distance to fasten the panel in place.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A device for transporting and positioning a panel comprising:
   an elongated support member having sides and opposite ends shorter than the sides, the support member having a base of sufficient length to carry a panel;
   an upright handle attached to the support member, the handle adapted to provide support for a panel carried by the support member base;
   an axle secured to the support member between the ends in a direction perpendicular to the length of the base;
   at least two wheels rotationally mounted on the axle, at least one wheel on each side of the support member and of sufficient size to permit the support member to pivot about the axle to raise and lower the support member ends;
   a lifting lip attached to one end of the support member extending beyond the wheels in one direction; and
   a foot pedal attached to the other end of the support member extending beyond the wheels in the opposite direction,
   wherein, the panel may be carried on the support member base and transported to a desired location and, after removing the panel from the base and placing it on the lip in a position approximately perpendicular to the length of the base, the wheels may move the panel toward and away from the desired location and the foot pedal may be depressed by a user to pivot the support member about the axle and cause the lip to lift the panel to a position at a desired height at the location.

2. The device of claim 1 wherein the lip is at an angle to the support member base.

3. The device of claim 1 wherein the foot pedal is elevated from the support member base.

4. The device of claim 1 wherein the handle comprises two upwardly extending members each having an end attached to the support member and an opposite end attached to a cross member, wherein the handle may be grasped by the user to assist in moving the panel toward and away from the desired location and to lift the panel to a position at a desired height at the location.

5. The device of claim 1 wherein the handle comprises an upwardly extending member having an end attached to the support member and an opposite end connected to a cross member, wherein the handle may be grasped by the user to assist in moving the panel toward and away from the desired location and to lift the panel to a position at a desired height at the location.

6. The device of claim 1 including a pair of support member guide plates extending upward on opposite sides of the base to hold the panel in position on the base during transport.

7. The device of claim 1 wherein the support member and handle are metal.

8. The device of claim 1 wherein the support member and handle are plastic.

9. A device for transporting and positioning a panel comprising:
   an elongated support member having sides and opposite ends shorter than the sides, the support member having a base of sufficient length to carry a panel;
   an upright handle attached to the support member, the handle adapted to provide support for a panel carried by the support member base;
   an axle secured to the support member between the ends in a direction perpendicular to the length of the base;
   a pair of wheels rotationally mounted on the axle, with one wheel on each side of the support member and being of sufficient size to permit the support member to pivot about the axle to raise and lower the support member ends, the support member extending beyond the wheels in opposite directions;
   a lifting lip attached to one end of the support member, the lip being at an angle to the support member base; and
   a foot pedal elevated from the support member base and attached to the other end of the support member,
   wherein the panel may be carried on the support member base and transported to a desired location and, after removing the panel from the base and placing it on the lip in a position approximately perpendicular to the length of the base, the wheels may move the panel toward and away from the desired location and the foot pedal may be depressed by a user to pivot the support member about the axle and cause the lip to lift the panel to a position at a desired height at the location, and
   wherein the handle may be grasped by the user to assist in moving the panel toward and away from the desired location and to lift the panel to a position at a desired height at the location.

10. A method for transporting and positioning a panel comprising:
    providing a panel;
    providing a device for transporting and positioning the panel comprising an elongated support member having sides and opposite ends shorter than the sides, the support member having a base of sufficient length to carry a panel, an upright handle attached to the support member, the handle adapted to provide support for a panel carried by the support member base, an axle secured to the support member between the ends in a direction perpendicular to the length of the base, at least two wheels rotationally mounted on the axle, at least one wheel on each side of the support member and of sufficient size to permit the support member to pivot about the axle to raise and lower the support member ends, a lifting lip attached to one end of the support member extending beyond the wheels in one direction, a foot pedal attached to the other end of the support member extending beyond the wheels in the opposite direction;

placing the panel on the support member such that a bottom edge of the panel rests on the support member base;

exerting a force on the handle sufficient to cause the wheels to rotate to move the device and transport the panel in a desired direction;

removing the panel from the device and placing the panel on the floor near a desired location of installation;

orienting the support member base in a direction approximately perpendicular to the panel and placing the angled lip extending in the one direction beyond the wheels under a bottom edge of the panel;

moving the panel with the wheels toward and away from the desired location and exerting a force on the foot pedal extending beyond the wheels in the opposite direction sufficient to pivot the support member about the axle and raise the lip and panel to a position at a desired height at the location; and securing the panel in a desired location.

11. The method of claim 10 wherein the lip is at an angle to the support member base.

12. The method of claim 10 wherein the foot pedal is elevated from the support member base.

13. The method of claim 10 including exerting an upward force on the handle and carrying the device and panel over terrain not suitable for rolling the device.

14. The method of claim 10 including exerting a force on the handle to assist in moving the panel toward and away from the desired location while lifting the panel to a position at a desired height at the location.

15. The method of claim 10 wherein the handle comprises two upwardly extending members each having an end attached to the support member and an opposite end attached to a cross member.

16. The method of claim 10 wherein the handle comprises an upwardly extending member having an end attached to the support member and an opposite end connected to a cross member.

17. The method of claim 10 including a pair of support member guide plates extending upward on opposite sides of the base to hold the panel in position on the base during transport.

18. The method of claim 10 wherein the support member and handle are metal.

19. The method of claim 10 wherein the support member and handle are plastic.

20. The method of claim 10 wherein the support member extends beyond the wheels in opposite directions.

* * * * *